(12) United States Patent
Hobbs et al.

(10) Patent No.: US 8,411,978 B1
(45) Date of Patent: Apr. 2, 2013

(54) GROUP ENCODING OF WAVELET PRECISION

(75) Inventors: David Victor Hobbs, Surrey (CA);
Patrick Ratto, Burnaby (CA); Debra Dorey, legal representative, Burnaby (CA)

(73) Assignee: Teradici Corporation, Burnaby, British Columbia (CA)

( * ) Notice: Subject to any disclaimer, the term of this patent is extended or adjusted under 35 U.S.C. 154(b) by 1213 days.

(21) Appl. No.: 11/771,797

(22) Filed: Jun. 29, 2007

Related U.S. Application Data

(63) Continuation-in-part of application No. 11/624,166, filed on Jan. 17, 2007.

(60) Provisional application No. 60/820,259, filed on Jul. 25, 2006, provisional application No. 60/759,708, filed on Jan. 17, 2006.

(51) Int. Cl.
*G06K 9/36* (2006.01)

(52) U.S. Cl. ........ 382/240; 382/232; 382/248; 382/236; 382/233; 375/240.19; 345/667

(58) Field of Classification Search .................. 382/240, 382/232, 248, 236, 233
See application file for complete search history.

(56) References Cited

U.S. PATENT DOCUMENTS

| | | | |
|---|---|---|---|
| 5,764,807 A * | 6/1998 | Pearlman et al. | ............. 382/240 |
| 5,838,377 A | 11/1998 | Greene | |
| 6,148,110 A | 11/2000 | Yajima et al. | |
| 6,236,684 B1 * | 5/2001 | Wu | .......................... 375/240.19 |
| 6,510,251 B1 | 1/2003 | Shirouzu et al. | |
| 6,549,674 B1 | 4/2003 | Chui et al. | |
| 6,782,136 B1 | 8/2004 | Lerner et al. | |
| 2006/0233201 A1 | 10/2006 | Wiesenthal | |

OTHER PUBLICATIONS

Examiner is notified of office communication (Mail date Jun. 4, 2008) associated with co-pending U.S. Appl. No. 11/549,055 entitled "Methods and Apparatus for Bridging a Peripheral Interface Controller", filed Oct. 12, 2006 in which US2006/0233201A1 (Oct. 2006 Wiesenthal).

Lawson, S. et al., Image Compression Using Wavelets and JPEG2000: a Tutorial, Electronics & Communication Engineering Journal, Jun. 2002, pp. 112-121.

Examiner is notified of office communication (Mail date Mar. 2, 2010) associated with co-pending U.S. Appl. No. 11/624,166 entitled "Methids and Apparatus for Encoding a Masked Image", filed Jan. 17, 2007.

Davis, Geoffrey M. et al., "Image Coding Using Optimized Significance Tree Quantization," Proceedings Data Compression Conference, DCC '97., held in Snowbird, UT, USA, Mar. 25-27, 1997, pp. 387-396, (10 pages) IEEE, New York, NY, USA.

(Continued)

*Primary Examiner* — Kathleen Y Dulaney
*Assistant Examiner* — Ruiping Li
(74) *Attorney, Agent, or Firm* — Lewis and Roca LLP

(57) ABSTRACT

A method and system of transmitting a set of wavelet coefficients, the wavelet coefficients representing an image, comprising: arranging a set of wavelet coefficients into a spatially-oriented tree data structure of groups of wavelet coefficients, determining group significance levels for groups in the tree; computing encoded data associated with a refinement range, the refinement range describing a selection from the group consisting of one of an initial quality level and an incremented quality level, to which an image is encoded, the encoded data describing group significance levels in terms of partial scalar components, the partial scalar components related to the refinement range, the encoded data further describing portions of the set of wavelet coefficients that are within the refinement range; and transmitting the encoded data.

31 Claims, 11 Drawing Sheets

OTHER PUBLICATIONS

Davis, Geoffrey M. et al., "Wavelet-based Image Coding: An Overview," in Applied and Computational Control, Signals, and Circuits, B. N. Datta (ed.), 1999, vol. 1, pp. 205-269, (65 pages), Birkhauser, Boston, USA.

Malvar, H., "Progressive Wavelet Coding of Images," IEEE Data Compression Conference, Salt Lake City, UT, Mar. 1999, pp. 336-343, (9 pages), IEEE, New York, NY, USA.

Pearlman, William A. et al., Efficient, Low-Complexity Image Coding with a Set-Partitioning Embedded Block Coder, IEEE Trans. Circutis and Systems for Video Technology, Nov. 2004, vol. 14, pp. 1219-1235 (23 pages), IEEE, New York, NY, USA.

Said, A. et al., "A New, Fast and Efficient Image Codec Based on Set Partitioning in Hierarchical Trees," IEEE Trans. Circuits Syst. Video Technology, Jun. 1996, vol. 6, pp. 243-250,(16 pages), IEEE, New York, NY, USA.

Shapiro, J., "Embedded Image Coding Using Zerotrees of Wavelet Coefficients," IEEE Trans. Signal Processing, Dec. 1993, vol. 41, pp. 3445-3462, (18 pages), IEEE, New York, NY, USA.

Taubman, D, "High performance scalable image compression with EBCOT," IEEE Trans. Image Processing, Jul. 2000, vol. 9, pp. 1158-1170, (5 pages), IEEE, New York, NY, USA.

* cited by examiner

GROUP ENCODING OF WAVELET PRECISION

RELATED APPLICATION

This application claims priority to U.S. Provisional Patent Application Ser. No. 60/820,259, entitled "GROUP ENCODING OF WAVELET PRECISION," filed Jul. 25, 2006, and is a continuation-in-part of co-pending U.S. patent application Ser. No. 11/624,166 entitled "METHODS AND APPARATUS FOR ENCODING A MASKED IMAGE" filed on Jan. 17, 2007, which claims priority to U.S. Provisional Patent Application Ser. No. 60/759,708, entitled "METHODS AND APPARATUS FOR ENCODING A MASKED IMAGE," filed Jan. 17, 2006, which are hereby incorporated by reference as if set forth herein.

FIELD

The invention relates generally to methods for coding digital images. More specifically, the invention provides a system and method that enables fast coding of wavelet coefficients to any desired improved refinement level for progressive transmission applications.

BACKGROUND OF THE INVENTION

Wavelet-based image coding for the purposes of compression and progressive transmission is the subject of many scientific papers, surveys and standardization initiatives. Well known methods include methods such as Embedded Zerotree Wavelet (EZW) coding, Set Partitioning in Hierarchical Trees (SPIHT), and Embedded Block Coding with Optimized Truncation (EBCOT).

The EZW method exploits the self-similarity of a transformed image to enable an initial transmission of coarser scale coefficients, followed by the ordered transmission of refinement bits at successive bit plane levels. Coefficients deduced as zero in a particular pass need not be coded which ensures efficient compression when a zero tree is encountered. The EZW method typically requires an arithmetic encoder to process the symbols generated by the successive quantization process.

Various other wavelet coding methods use the concepts of EZW. SPIHT is a popular alternative that uses a different parent-child relationship to achieve a high performance even without an arithmetic encoder. However, SPIHT requires iterative pre-computation for the coding of each bit plane level which adds latency in a real time coding application. EBCOT, and related JPEG 2000-based coding, partitions each sub-band into blocks of samples and generates a separate scalable bit-stream to represent each code-block, thereby enabling selective decoding in applications seeking to improve resolution in only a portion of an image. Progressive Wavelet Coding (PWC) is an embedded coding method that uses adaptive run length encoding of bit planes of quantized wavelet transform coefficients to generate an embedded bit stream of bit-plane encoded macro-blocks that is scalable in resolution and fidelity. PWC uses explicit blocking of ordered coefficients to achieve resolution-based scalability and layering.

In summary, there are various wavelet coding techniques aimed at addressing the requirements for progressive image transmission. However, existing methods typically require incremental encoding of each bitplane and are unsuitable for applications in which an image changes rapidly and fast coding is desired. Therefore, there is a need for an improved method that is better suited to coding images for real-time progressive transmission.

SUMMARY OF THE INVENTION

A system and methods that enable the progressive coding of wavelet coefficients to any desired improved refinement level with each coding pass is described. Unlike existing wavelet coding methods such as methods based on significance maps that use a series of thresholds to generate incrementally improved refinement levels with each coding pass, the described system and methods enable direct encoding to any next refinement level based on external factors such as real time network transmission bandwidth availability. The ability to encode to any refinement level in one step ensures a constant processing time and offers advantages over the variable processing incurred by incremental processing methods, especially in real time pipelined implementations such as dedicated image processing circuits.

In one aspect, a method that encodes wavelet coefficients in relation to the significance level of an associated group in a spatial orientation tree rather than in relation to a common significance threshold across an image is described. This eliminates repetitious bitplane processing used by existing methods.

In another aspect, encoding and decoding apparatus comprising elements for encoding and decoding of group information are described. Embodiments include software embodiments or hardware circuit embodiments suited to real time progressive transmission.

An embodiment supports encoding and decoding of masked images wherein masked regions are ignored resulting in increased coding efficiency. Unlike image projection approaches that fill the masked pixels with hallucinated values, compression is optimized when masked coefficients are ignored altogether. In summary, the disclosed methods and apparatus improve coding and real time progressive transmission of unmasked or masked image types.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

In the following detailed description of the present invention, 'Group Encoding of Wavelet Precision', numerous specific details are set forth to provide a more thorough description of embodiments of the invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment.

Furthermore, the particular features, structures, or characteristics may be combined in any suitable manner in one or more embodiments. References to "Group Encoding of Wavelet Precision" and related apparatus described by this specification are abbreviated by the terms 'GrEWP encoding', 'GrEWP encoder', 'GrEWP decoding' and 'GrEWP decoder' throughout the specification for convenience of reference. While the terms 'encoding' and 'decoding' are used to describe forward and inverse data transformations respectively, this specification also uses the term 'coding' in a more general sense to describe operations associated with both encoding and decoding.

Figure 1:
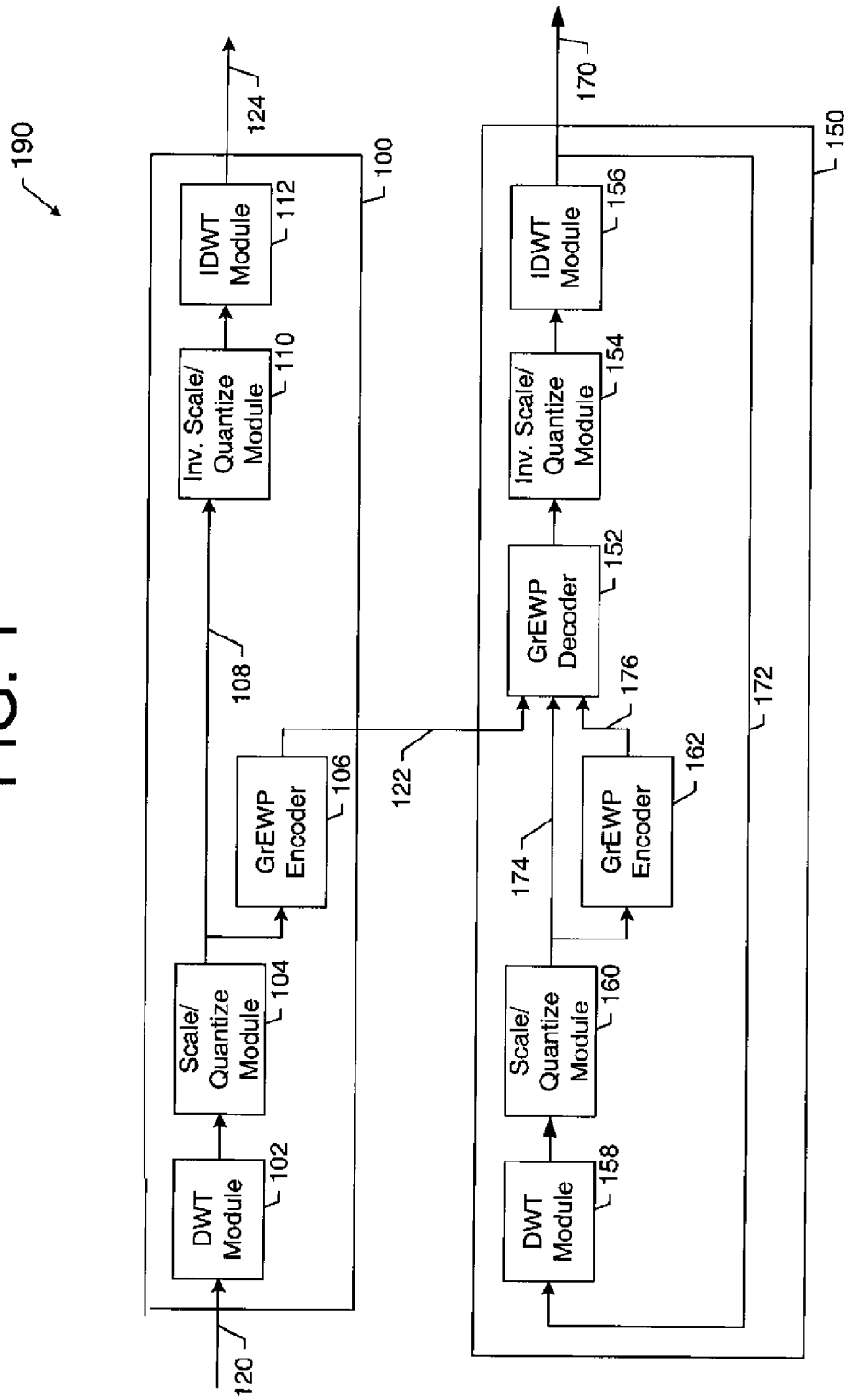
FIG. 1 illustrates an embodiment of an encoder/decoder system suitable for progressive transmission using GrEWP encoding.

FIG. 1 illustrates an embodiment of an encoder/decoder system suitable for progressive transmission using GrEWP encoding. System 190 in FIG. 1 comprises pipelined image processing encoder and decoder sub-systems. Each sub-system can be implemented using hardware circuitry such as one or more Field Programmable Gate Arrays (FPGA), Application Specific Integrated Circuits (ASICs) or the like but other embodiments such as a computer program executing on a PC or alternative computer platform are also contemplated.

In the exemplary embodiment of FIG. 1, system encoder 100 comprises Discrete Wavelet Transform (DWT) module 102, scale/quantize module 104, GrEWP encoder 106, inverse scale/quantize module 110 and inverse DWT module 112. Input image 120 is tiled, for example using 16×16 pixel areas, undergoes wavelet transformation, coefficient scaling and quantization using wavelet transformation methods known to the art.

Figure 4:
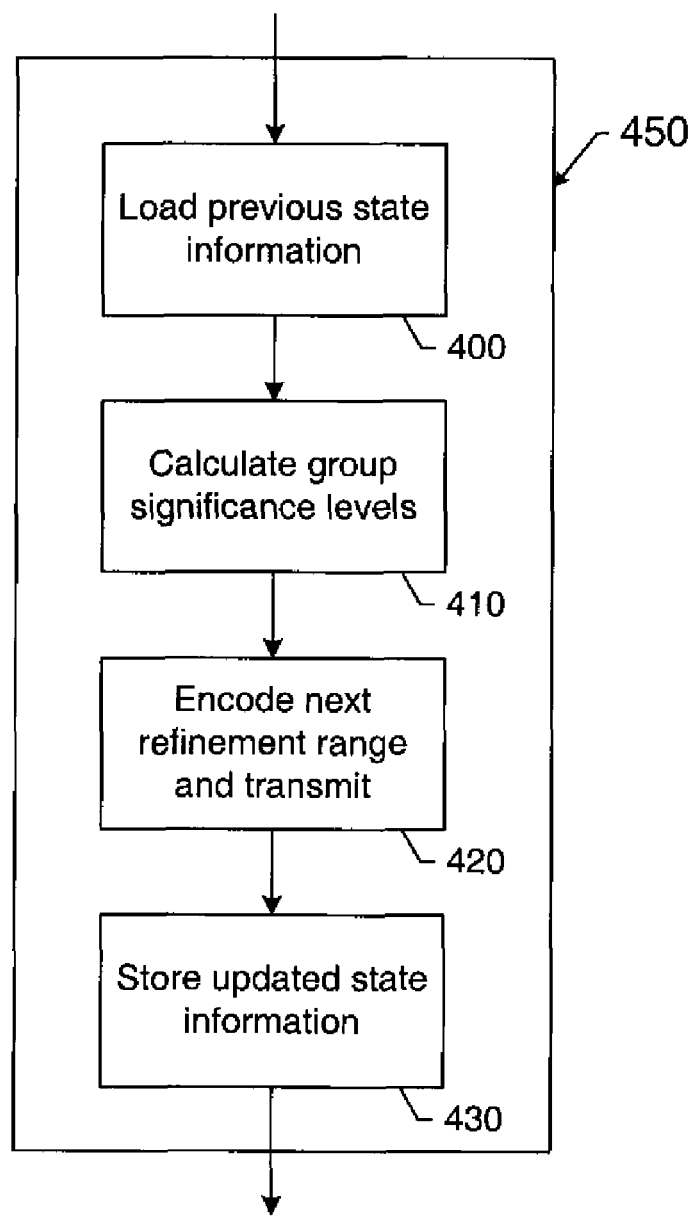
FIG. 4 is a flowchart illustrating a method of operation of a GrEWP encoder.

GrEWP encoder 106 executes progressive GrEWP encoding of the scaled wavelet transform to generate a bitstream containing the coefficient refinement information necessary to build a display image from a present level of refinement to a subsequent desired refinement level, herein termed a 'refinement range'. The methods used by encoder 106 are illustrated in FIG. 4 below. In one embodiment, input image 120 is a masked image which is subjected to masked DWT transform methods and masked GrEWP encoding illustrated in FIG. 11.

Encoded image bitstream 122 comprising encoded coefficient segments and encoded spatial orientation tree group information is encapsulated using a network transport protocol such as TCP/IP and transmitted to system decoder 150. Quantized coefficients 108 are subjected to inverse transformation using inverse scale/quantize module 110 and inverse DWT (IDWT) module 112. which generates reference image 124 used to determine and maintain the current pixel state at system decoder 150. System decoder 150 comprises GrEWP decoder 152 which recovers transform coefficient data from encoded image bit stream 122. Output data from decoder 152 is fed into inverse scale/quantize module 154 and IDWT module 156 which perform inverse transformation operations and generate output display image 170.

Figure 6:
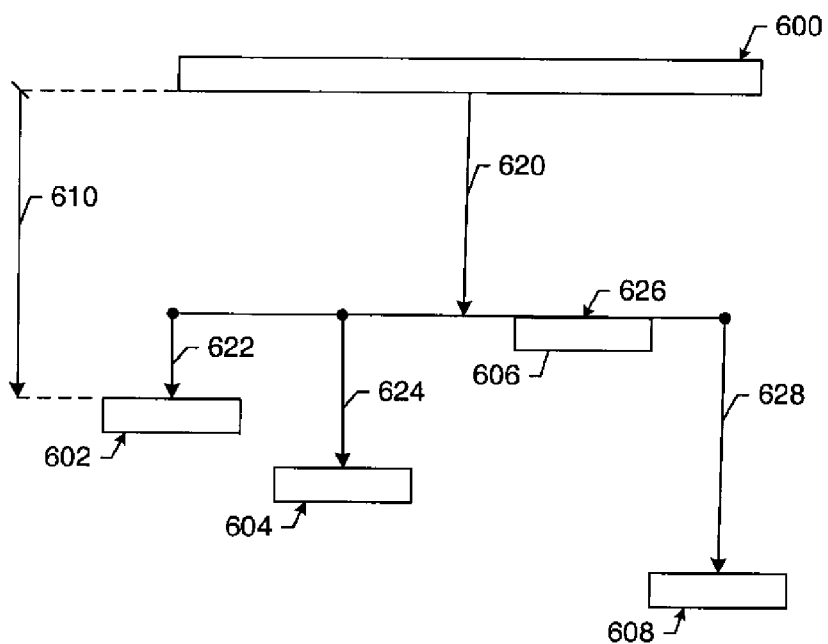
FIG. 6 shows an embodiment of group information for a representative cluster of groups to be encoded.

To support progressive transmission and decoding, decoder 152 accesses the previous progressive build state of display image 170 that is used as a basis for the next build state. In one embodiment, a transformed image is stored local to the decoding system. However, this approach is memory and processing bandwidth intensive. In another embodiment, previous display image 172 is processed by DWT module 158, scale/quantize module 160 and GrEWP encoder 162 which execute a forward wavelet transform substantially similar to the DWT transform executed by DWT module 102, scaling and quantization substantially similar to the scaling and quantization executed by module 104, and GrEWP encoding substantially similar to encoding performed by GrEWP encoder 106. This processing regenerates image coefficients 174 and group information (reference 176) used as the previous build state input for decoder 152. Note that the term 'group information' is used for convenience of reference in this specification to describe encoded spatial orientation tree information such as illustrated in FIG. 6.

It will be recognized to those skilled in the art that system encoder 100 and system decoder 150 may be incorporated into computing platforms associated with image encoding and transmission. In an embodiment, system 100 is incorporated into a host computer that generates a computer display image stream and used to compress the image stream prior to transmission. System 150 is incorporated in a corresponding client system that receives, decodes and displays the image.

In an embodiment, DWT module 158, scale/quantize module 160, GrEWP encoder 162, inverse scale/quantize module 154 and IDWT module 156 are substantially similar to the equivalent named modules in system encoder 100.

Figure 2:
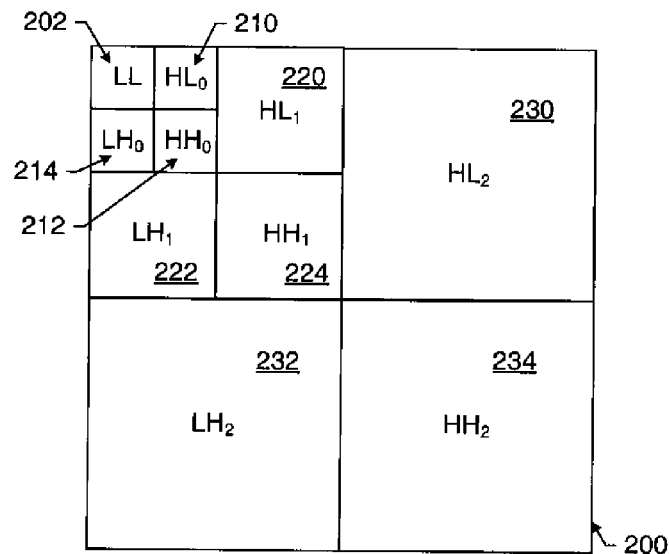
FIG. 2 is a prior art diagram depicting an ordered set of wavelet coefficients for a transformed 8×8 image block.

FIG. 2 is a prior art diagram depicting an ordered set of wavelet coefficients 200 for a transformed 8×8 image block. Coefficients 200 provide a naming convention for components of the spatial orientation tree illustrated in FIG. 3.

Top left LL coefficient 202 in FIG. 2 is the lowest frequency component with HL0 coefficient 210, HH0 coefficient 212 and LH0 coefficient 214 representing the next subband set. HL1, LH1, and HH1, coefficients representing the next set of sub-bands are shown in regions 220, 222 and 224 respectively. HL2, LH2, and HH2, coefficients representing the highest frequency coefficient sets are shown in regions 230, 232 and 234 respectively.

Coefficients 200 make up a block of standard 2N dimension but alternative embodiments comprising extended block formats are also contemplated. As an example, an embodiment of block dimension 2N+1 is a useful format for a transform with reduced edge artifacts. Such an embodiment comprises five sub-trees, three of which are quad-trees and two that are binary trees. In the case of a 2N+1 embodiment, the last row and column of the block may be masked prior to transform and encoding. GrEWP encoding of masked images is discussed further in FIG. 11.

Figure 3:
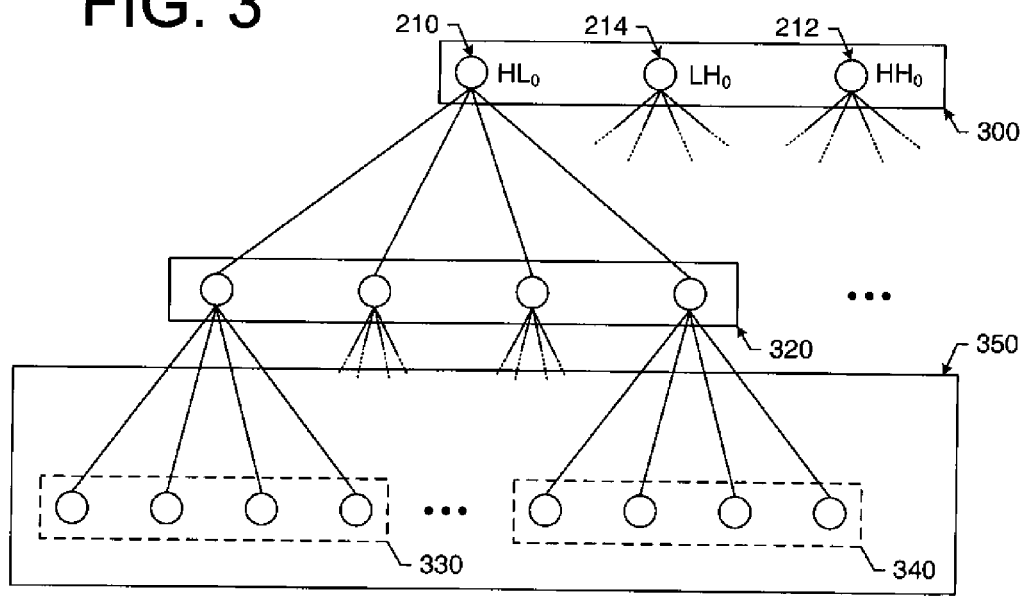
FIG. 3 illustrates the coefficients of a wavelet transform logically arranged in a spatial orientation tree.

FIG. 3 shows coefficients 200 (reference FIG. 2) organized in a spatial orientation tree so that a group significance level can be assigned to each group in the tree. In the present specification, the term 'significance level' describes the bit position of the most significant bit of the absolute value of a coefficient and the term 'group significance level' defines the highest significance level from the set comprising the significance level of each sibling coefficient in a group and the group significance levels for all descendent groups associated with that group. The group significance level is used to determine the number of bits required to describe the coefficients in that group based on the significance of the coefficients in the group and its descendants.

Typically, groups in lower frequency sub-bands higher in the tree have higher group significance levels while groups at higher sub-band frequencies have lower group significance levels. In less frequent cases where coefficients at higher sub-band frequencies have relatively high significance, their significance levels are propagated up the spatial orientation tree as high group significance levels which generate equivalent higher symbol rates in earlier progressive encoding passes.

In the embodiment of FIG. 3, HL0 coefficient 210, HH0 coefficient 212 and LH0 coefficient 214 (all introduced in FIG. 2) form root group 300 with a pseudo-parent at the highest significance level. In other embodiments, top level coefficients may be related to different pseudo-parents of different significance levels.

At lower levels in the tree, a group is defined as a set of sibling coefficients with a common parent coefficient. In FIG. 3, HL0 coefficient 210 has four child coefficients forming group 320 comprising coefficients associated with HL1 region 220 in FIG. 2 at a next sub-band level. On a broader scale, the present specification also defines a cluster of groups as a set of sibling groups sharing a common parent group. For example, leaf groups 330, 340 and the other two groups not shown in FIG. 3 form cluster 350 comprising coefficients associated with region 230 in FIG. 2.

A coarse representation of the image is coded using the more significant coefficient information located higher in the tree within the lower frequency sub-bands and then progressive refinements are made by adding less significant coefficient information. Each scaled coefficient value in the tree is defined to have a significance level of N determined by evaluating the position of the most significant bit according to the formula:

$$N = \text{floor}(\log_2(m)) \quad (1)$$

where m is the magnitude of the coefficient and floor( ) is a standard truncation function that casts the result as the nearest lower (or equal) integer.

GrEWP encoding computes a significance level for each group that enables the encoding of coefficients in relation to their own group significance levels rather than in relation to a common significance threshold, eliminating any need for repetitive processing when encoding a range of bitplanes. A method for calculating group significance levels is described herein and illustrated in FIG. 5.

In an embodiment, GrEWP encoding method 450 in FIG. 4 is executed by GrEWP encoder 106 in FIG. 1 to encode a set of scaled wavelet transform coefficients, such as coefficients 200 in FIG. 2. On each pass of method 450, segments of coefficients within a determined refinement range are encoded and transmitted, thereby incrementally improving the refinement level of the image. In one example of a pipelined embodiment, all the steps of method 450 are repeated for every progressive encoding pass. This negates the need to store substantial amounts of state information for the next encoding pass. In some embodiments such as a software encoder, the calculation of group significance levels (ref. step 410 described below) may be executed in advance and skipped on subsequent encoding passes to avoid repeat calculations. Information computed in step 410 is then stored and reloaded on each subsequent pass.

Referring to FIG. 4, previous state information, including the current refinement level from the previous progressive encoding pass is loaded as a first step 400.

Figure 5:
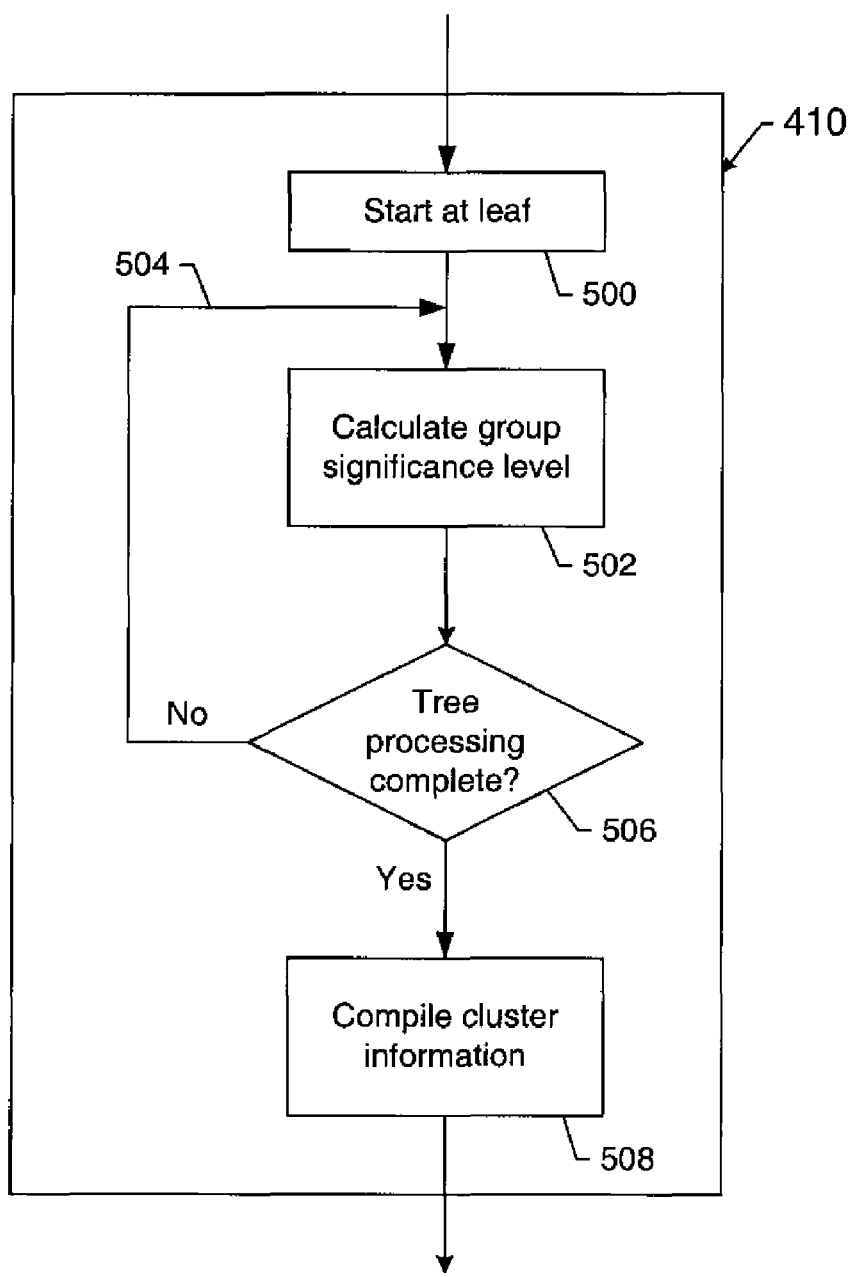
FIG. 5 is a diagram illustrating a method for calculating group significance levels.

As a next step 410, group significance levels are calculated. In an embodiment, scaled wavelet transform coefficients are organized in a spatial orientation tree such as shown in FIG. 3 and a group significance level is calculated for each group of coefficients at each level of the tree using a computation method such as illustrated in FIG. 5.

Figure 7:
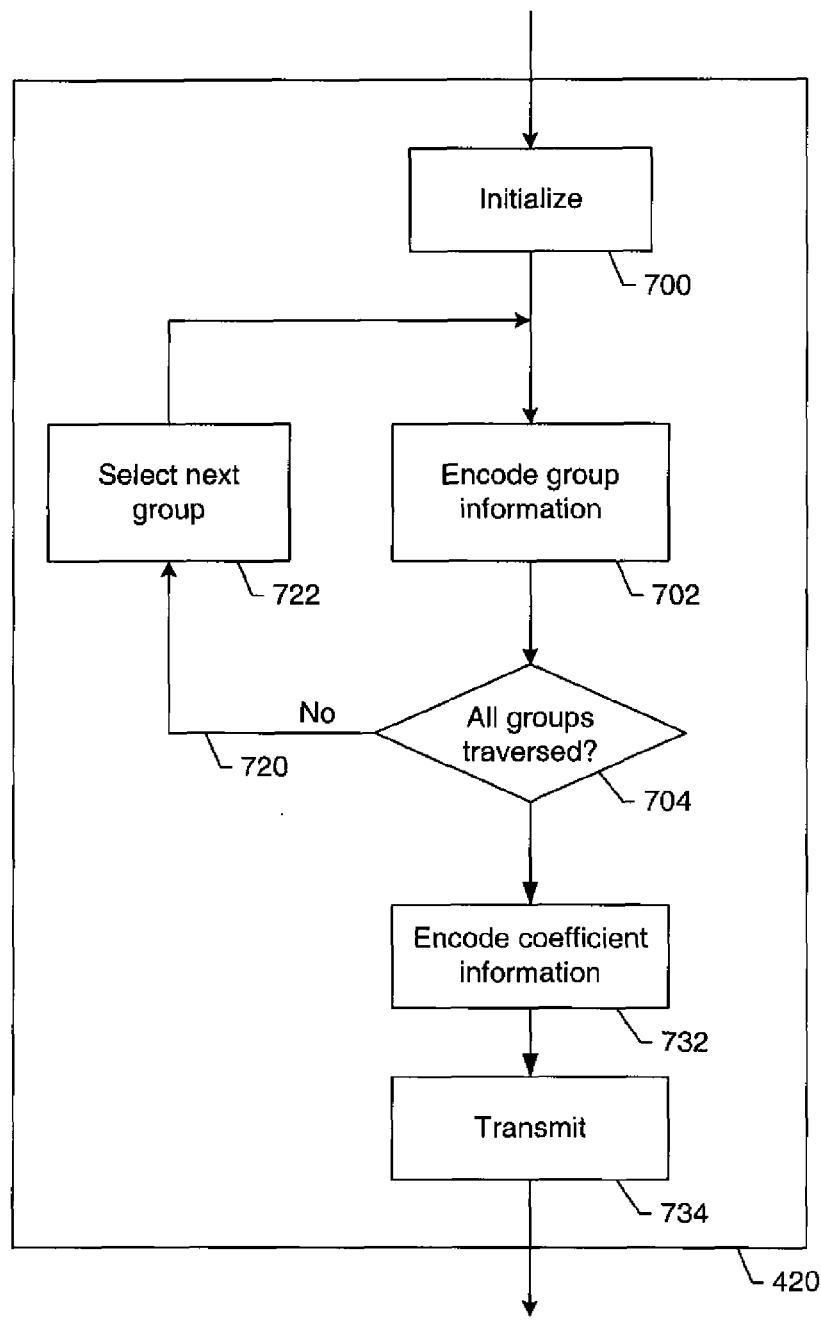
FIG. 7 is a flowchart of a method for encoding the next refinement range of a set of wavelet coefficients.

As a next step 420, a first or subsequent refinement range is selected, encoded and the bitstream transmitted. For example, a refinement range may be selected based on network transmission bandwidth availability as determined by image attributes such as predicted network transmission bandwidth for a refinement range or external bandwidth factors such as network availability determined using congestion monitoring methods. The current refinement level retrieved in step 400 determines the starting point for encoding. Group significance levels computed in step 410 enable direct optimized group information encoding across all sub-bands that will be encoded to the next refinement level without repetitious incremental bitplane processing. An embodiment of step 420 that encodes group and coefficient refinement information is illustrated in FIG. 7.

As a next step 430, updated state information comprising the new refinement level for the image section is stored for use during the next progressive encoding pass.

In an embodiment, method 450 is repeated for each unchanged input image block until all refinement levels have been transmitted or until the input image changes. Once all refinement information has been transmitted, method 450 is bypassed until the input image block (reference 120 in FIG. 1) changes again.

FIG. 5 is a diagram that shows a method for calculating group significance levels such as used in step 410 of FIG. 4. In an embodiment, the calculation of group significance levels starts at a leaf group such as leaf group 330 in FIG. 3 as step 500.

As a next step 502, a group significance level is calculated for the selected first leaf group. Given that leaf groups have no children, the calculation of a group significance level for a leaf group is reduced to determining the significance level N (ref. equation 1) for each coefficient in the group under analysis and identifying the highest significance level.

As a next series of iterations, group significance calculation 502 is repeated (processing loop 504) for other leaf groups in the spatial orientation tree, and upward across all sub-bands, for example in a zigzag pattern, ensuring that group significance levels for all child groups are determined before their parent groups. Unlike the group significance level calculations for leaf nodes, the calculations at the second and higher sub-band levels must also take descendent group significance levels into consideration. The process ends once a group significance level has been calculated for root group 300 (reference FIG. 3) as determined by tree processing completion check 506.

Once group significance levels have been calculated for all sub-bands, cluster information defining the significance level of each cluster in the tree is compiled as step 508. The significance level of a cluster is the highest significance level identified when comparing all sibling groups in that cluster. In a masked embodiment, cluster information also describes the number of unmasked groups in a cluster.

While step 508 is shown as a pre-processing step ahead of progressive encoding in the embodiment of FIG. 5, another embodiment uses a run-time determination without preprocessing and wherein cluster information is determined on the fly. In other embodiments such as some hardware implementations, it is more efficient to compile both cluster information and group information during tree traversal to avoid a second pass. Encoding of group information is discussed in the description associated with FIG. 6.

FIG. 6 illustrates group information for a representative cluster of groups to be encoded. In an exemplary embodiment progressive encoding traverses a spatial orientation tree from root to leaves, starting at an improved refinement level with each pass. Group significance levels for each group in the refinement range are encoded as a set of differential values (termed group significance delta values) for optimum efficiency, i.e., a group significance delta is defined as the difference between a child group significance level and its parent group significance level. In the example of FIG. 6, differential group significance deltas for each cluster of groups are further decomposed into common and individual parts (i.e. common and individual scalar components) that quantify the difference in significance between a parent and all of its children.

Referring to FIG. 6, parent group 600 has child groups 602, 604, 606 and 608. The group significance delta value between child group 602 of significance level j and parent group 600 of significance level k is a value p=k−j where p is distance 610 shown. For coding efficiency, the four significance deltas between four children and their parent group are aggregated as a single common part which defines the delta between the parent group significance level and the highest child group significance level. Additional individual parts then define the additional delta values between the common part and child group significance levels. In the embodiment illustrated in FIG. 6, common part 620 is the significance delta between parent group 600 and child group 606. Individual parts 622, 624, 626 (of value zero) and 628 describe the significance deltas between the end of common part 620 and child groups 602, 604, 606 and 608 respectively. Note that child group 606 has the same significance level as the common part and although it appears to have no individual part in FIG. 6, individual part 626 has a value of zero and is therefore explicitly encoded as zero in an exemplary embodiment.

The cluster information computed as step 508 (ref. FIG. 5) provides the highest significance level of related child groups which enables the GrEWP encoder to determine the common part (ref. 620) before visiting all the children.

In an extension to the embodiment shown in FIG. 6, one or more member coefficients within a group are also assigned significance deltas that describe the difference between the member significance and group significance. This enables the formation of one or more sub-groups within a group and associated common part and individual part encoding within a group.

In a partially masked embodiment, the cluster information also provides the number of unmasked child groups in a cluster. This enables the GrEWP encoder to determine that it should not encode the individual part when there is only one unmasked group in a cluster, since that value is known to be zero. This enables the transmission of reduced data sets when masked groups are encountered. If there are two or more unmasked groups, group information is comprised of both common and individual parts for the unmasked groups as before.

The exemplary embodiment illustrated in FIG. 6 shows one example of the group relationships between a parent group and its children. In other embodiments, spatial significance trees have different significance relationships between members. For example, in one alternative embodiment, a cluster comprises child groups of equal significance and the common part of these child groups is encoded as an entity. In another alternative, the significance levels for child groups are set to that of their parent group. In this case, the common part is zero and coefficient information associated with the child group is encoded from the same significance level from which the parent group is encoded.

Figure 8:
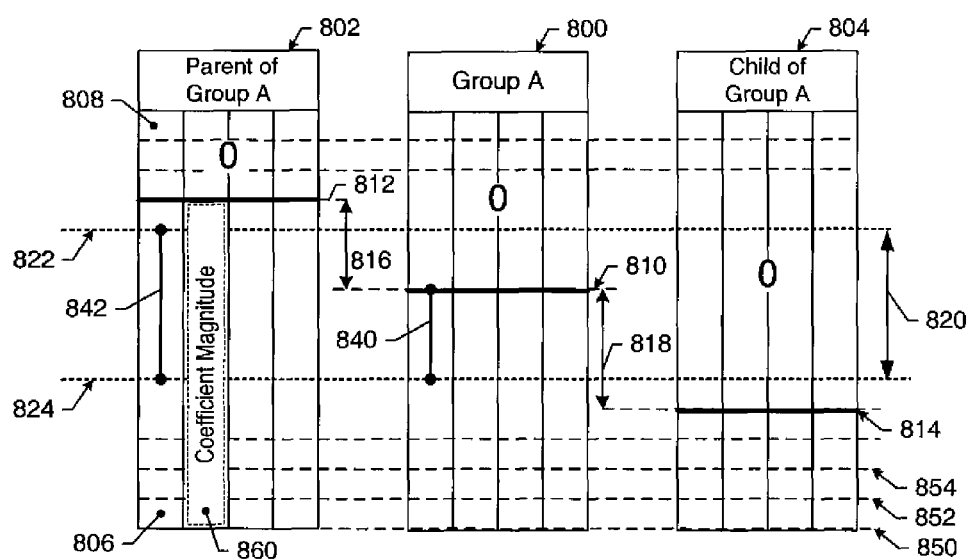
FIG. 8 shows an example group information encoding embodiment for a desired refinement range in a spatial orientation tree.

FIG. 7 is a flowchart that illustrates a method for encoding the next refinement range such as step 420 of FIG. 4. FIG. 8 augments FIG. 7 by illustrating a generalized group encoding example. In the exemplary embodiment of FIG. 7, encoding of a selected refinement range comprises encoding of group information and coefficient refinement information. Group information further comprises a set of encoded common parts (reference 620 in FIG. 6) and individual parts (reference 622, 624, 626 and 628 in FIG. 6) that fall within the refinement range. In embodiments where the refinement range includes partial common and individual parts, portions of the significance delta values in the refinement range are encoded. Each value is encoded as the difference between the previously encoded group significance level (as defined by the previous refinement range) and a desired group significance level defined by the current refinement range. After the group information is encoded, coefficient refinement information comprising a set of encoded values corresponding to partial coefficient values in the current refinement range is also encoded as necessary.

Referring to FIG. 7, encoding is initialized as a first step 700. Progressive encoding starts at the top of the spatial orientation tree in which the root group has the highest group significance level. On each pass, the next refinement range is defined by setting a start value to the previously encoded significance level and an end value to a desired significance level. Group and cluster information for the tree (for example, as compiled using the method illustrated in FIG. 5) is also loaded. The root group is selected to initialize the encoding of group information.

As a next step 702, group information is encoded. Group information for each group is determined according to the group's position relative to the refinement range in Table 1.

TABLE 1

Determination of Group Information

| Selected Group | Group relation to next refinement range | | |
|---|---|---|---|
| | Above Range | In Range | Below Range |
| Root Group | N/A | Code from the start value to the root group significance level | Code from start value to end value |
| Non root with parent in refinement range | N/A | Code whole significance delta value | Code from parent significance level to end value |
| Non root with parent above refinement range | Already coded | Code from start value to group significance level | Code from start value to end value |

Group information is then encoded as common and individual parts using the cluster information. The common part is encoded ahead of the first individual part when the first group in a cluster is visited. In an embodiment, common and individual parts are encoded using group significance delta codes from Table 3 described later.

As a next step 704 a determination is made whether all groups in the tree have been evaluated. In case 720, not all groups have been tested so a next group is selected as a next step 722 and the group information value for the newly selected group is encoded by repeating step 702. Each time step 722 is executed, a new group is selected such that the tree is traversed in any predetermined order in which parents are visited before children, for example a zigzag across each sub-band level and from root to leaves.

In an embodiment, the segments of all coefficients in the desired refinement range are determined and encoded as a next step 732 after all groups have been evaluated. Encoded group and coefficient information for the refinement range is then transmitted as a next step 734.

In other embodiments, only a subset of groups and related coefficients are evaluated, encoded and transmitted with each coding pass. Then the encoded group and refinement information associated with the subset is transmitted while other groups are encoded on subsequent passes. In an embodiment, the subset is determined by comparing the available network transmission bandwidth to the amount of encoded data associated with each group.

FIG. 8 shows an example group information encoding embodiment for a desired refinement range in a spatial orientation tree. Group A 800 has parent group 802 and child group 804. Child group 804 is one of four children for Group A. Each column of each table stores a binary representation of a magnitude value for one of the four coefficients in the group. The least significant bit (lsb) is located in the last row of the table (reference lsb 806) and the largest supported most significant bit (msb) is located in the top row of the column (reference msb 808). Coefficient magnitude 860 shows one such magnitude value. Group 800 has group significance level 810, parent group 802 has group significance level 812 and child group 804 has group significance level 814. In the embodiment of FIG. 8, group 800 is separated from parent group 802 by significance delta 816 while child group 804 is separated from group 800 by significance delta 818. Note that there are three additional significance deltas between group 800 and its other child groups not shown in FIG. 8. Levels 850, 852 and 854 indicate increasing levels of group significance.

Next desired refinement range 820 is defined by start bitplane of significance level 822 and end bitplane of significance level 824, where start bitplane 822 has the same significance level as the end bitplane from the previous encoding pass. Table 2 shows the group and coefficient information to be encoded for each group shown in FIG. 8 during refinement range encoding (reference steps 702 and 732 in FIG. 7):

TABLE 2

Example Coding Information for Group Hierarchy

| Group | Group Significance | Group Information | Coefficient Information |
|---|---|---|---|
| Group 802 (Parent of Group A) | Above range | Previously encoded | Encode from start bitplane 822 to end bitplane 824 |

TABLE 2-continued

Example Coding Information for Group Hierarchy

| Group | Group Significance | Group Information | Coefficient Information |
|---|---|---|---|
| Group 800 (Group A) | In range | Significance delta 816 Encode from start bitplane 822 to significance level 810 | Encode from significance level 810 to end bitplane 824 |
| Group 804 (Child of Group A) | Below range | Significance delta 818 Encode from significance level 810 to end bitplane 824 | No Data |

Group information for each group is encoded using a suitable efficient encoding system. In an embodiment, significance deltas are given truncated unary codes based on magnitude as shown in Table 3.

TABLE 3

Significance Delta Codes

| Significance Delta Magnitude | Code |
|---|---|
| 0 | 1 |
| 1 | 01 |
| 2 | 001 |
| 3 | 0001 |
| Greater than 3 | 0000 |

Referring to Table 3, a significance delta magnitude of greater than 3 is given a code of "0000" because it lies below the desired refinement range. In embodiments with greater desired refinement ranges, larger significance delta magnitudes are used. Coefficient information for coefficients in the desired refinement range is expressed in terms of the segment of a coefficient value between the group significance level or start bitplane and the end bitplane. As examples of candidate coefficient information, line segment 840 represents the segment of a coefficient in group 800 and line segment 842 represents the segment of a coefficient in parent group 802.

Table 4 shows a coding example for a coefficient comprising sign and magnitude values. In the example of Table 4, the sign bit is not encoded until the first significant bit of the coefficient is encountered (if ever).

TABLE 4

Sign Encoded Coefficient Information

| Data Format | | | | | | | |
|---|---|---|---|---|---|---|---|
| Sign and Magnitude Format (Input data) | S | 0 | 0 | 0 | 1 | 0 | 1 |
| Sign Encoded Format (Bitstream data) | 0 | 0 | 0 | 1 | S | 0 | 1 |

Figure 9:
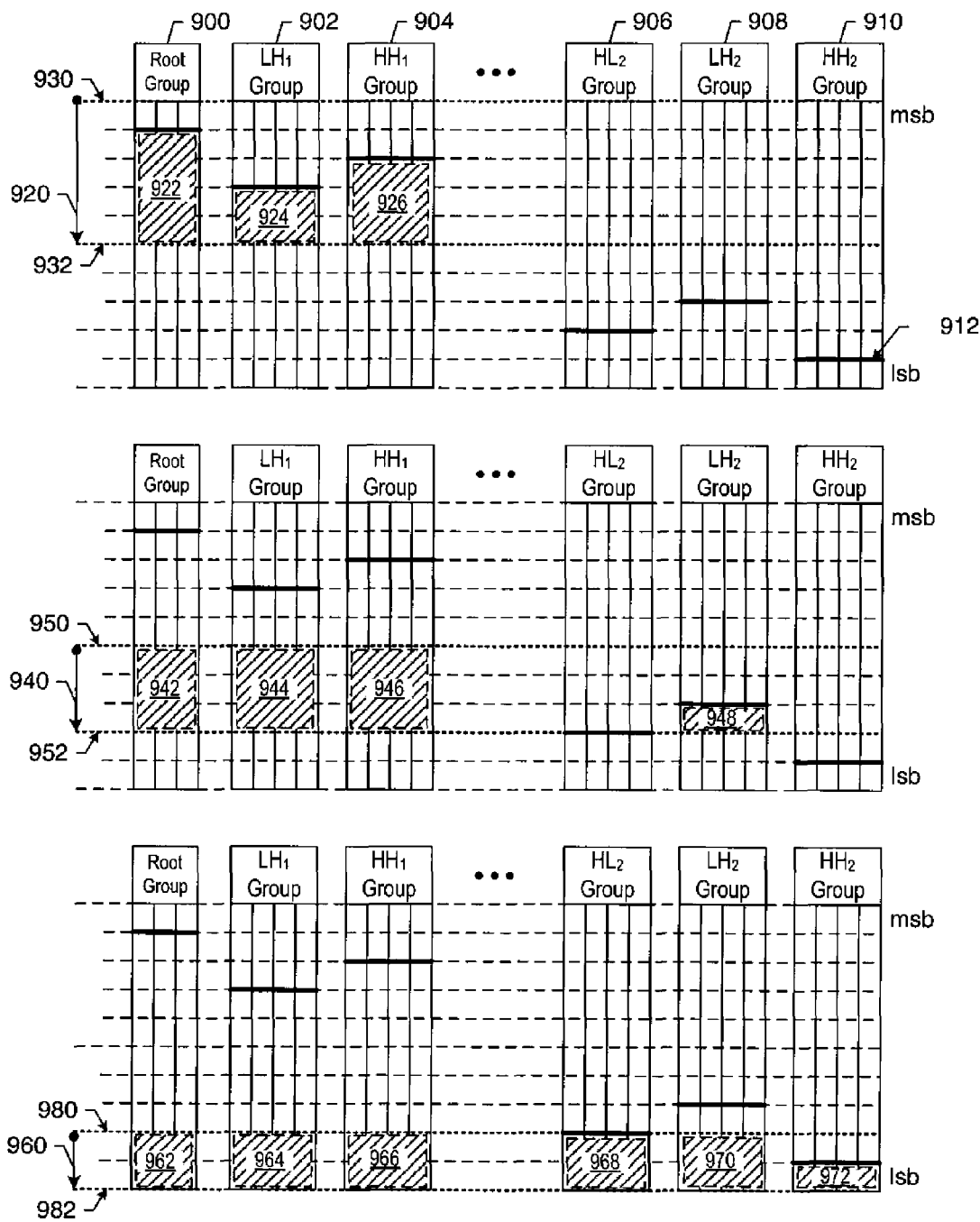
FIG. 9 illustrates an encoding example of a spatial orientation tree over a series of three encoding passes.

FIG. 9 shows an example encoding embodiment illustrating the progressive encoding of a spatial orientation tree over a series of three encoding passes. The embodiment shows root group 900, LH1 group 902, HH1 group 904 and leaf groups 906, 908 and 910. Other groups in the tree are not shown in FIG. 9 but assumed present. Coefficients are arranged in columns with least significant bits in the bottom row. Each group has an associated group significance at the level indicated by the thick line. For example, group 910 has group significance level 912 shown.

During a first encoding pass as indicated by progression 920, group information is encoded from start bitplane 930 (the highest possible significance level) to end bitplane 932, for example using the method of FIG. 8. Coefficient segments in shaded bitplane areas 922, 924 and 926 are also encoded. Group significance levels for groups 906, 908 and 910 are below desired refinement level 932 so no coefficient information for these groups is encoded.

During a second encoding pass 940, additional group information is once again encoded between start bitplane 950 to end bitplane 952 as required. Coefficient segments in shaded bitplane regions 942, 944, 946 and 948 are also encoded. Group significance levels for groups 906 and 910 remain below desired refinement level 950 so no coefficient information for these groups is encoded.

During a third and final encoding pass 960, additional group information is once again encoded between start bitplane 980 to end bitplane 982 as required. Exceptions include group information for groups 900, 902, 904 and 908 which are above start bitplane 980. Least significant coefficient portions in shaded bitplane areas 962, 964, 966, 968, 970 and 972 are also encoded.

Figure 10:
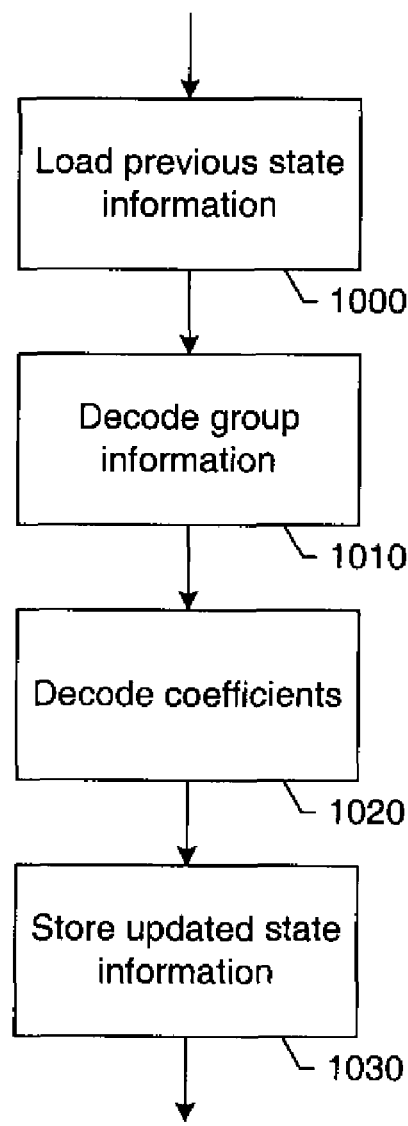
FIG. 10 is a flowchart showing a GrEWP decoding method.

FIG. 10 is a flowchart illustrating a GrEWP decoding method as might be executed by GrEWP decoder 152 in FIG. 1. As a first step 1000, previous state information is loaded. GrEWP and coefficient information are additive at the decoder and therefore use the previous significance delta values and partial coefficient values from the previous decode cycle in the calculation of new significance delta values and partial coefficient values.

As a next step 1010, group information is decoded. Significance delta values are recovered from the unary bitstream and added to previous significance delta values.

As a next step 1020, coefficient information is decoded from the sign encoded bitstream (for example the bitstream in Table 4) and either appended to existing coefficients (in cases where partial coefficients have been previously transmitted) or new coefficients of lower significance are introduced where null values were transmitted in the previous pass.

In an embodiment where updated state information comprising refinement level, coefficient information, group information and cluster information is not recovered from the reference image, this state information is stored as next step 1030.

Figure 11:
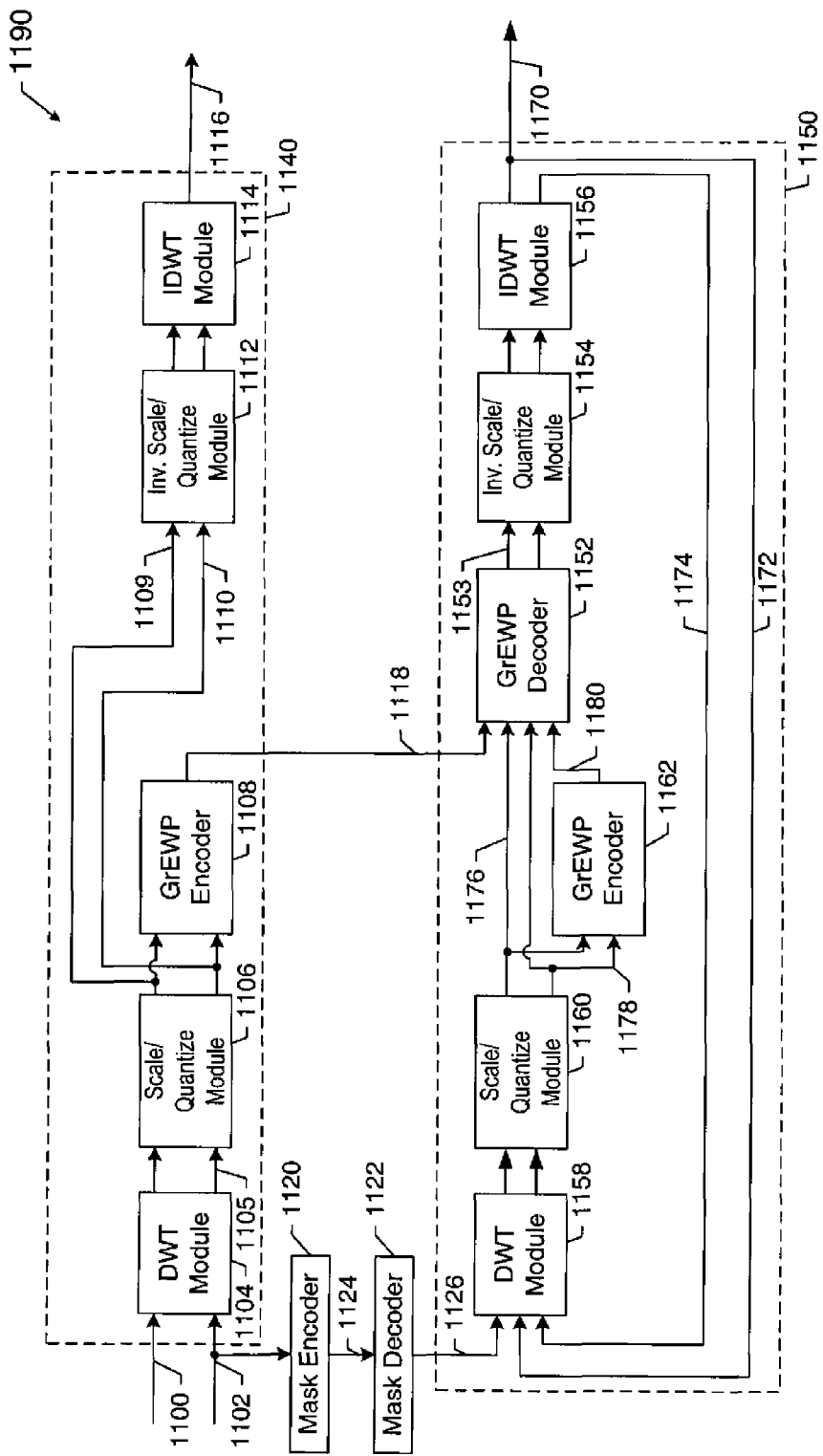
FIG. 11 shows an alternative encoder/decoder system that enables encoding and decoding of masked images.

FIG. 11 illustrates an alternative embodiment to system 190 of FIG. 1. System 1190 in FIG. 11 enables encoding and decoding of partially masked images such as a decomposed image comprising picture and text wherein the text areas are identified by a mask layer. System 1190 comprises a GrEWP encoder/decoder pair that enables the transmission of reduced coefficient information (i.e. reduced data sets) by avoiding the encoding, decoding or transmission of non-required masked image coefficient information. In the embodiment of FIG. 11, input image 1100 undergoes a masked transform in DWT module 1104. Masked areas of input image 1100 are defined according to input image mask 1102 in which the bits corresponding to masked locations of the input image are set on the mask.

DWT module 1104 executes a masked transform using any of several methods known to the art and generates a set of wavelet coefficients similar to those of a non-masked DWT transform with the exception that masked areas may be ignored in the transform and coding processes in the interests of efficiency.

In an embodiment, system encoder 1140 is similar to encoder 100 in FIG. 1 with an additional pipeline path for the encoded mask. Input image 1100 is transformed by DWT module 1104, scaled and quantized by scale/quantize module 1106 and encoded by GrEWP encoder 1108 using previously described methods for generating group information for a masked image. Input mask 1102 is transformed by DWT module 1104, for example using an independent mask processor in module 1104 that reorders the mask bit pattern to correspond with reordered coefficients associated with input image 1100. Transformed mask 1105 passes through scale/quantize module 1106 without further modification and is used by GrEWP encoder 1108 to determine cluster and group information for the masked spatial orientation tree.

Encoded masked image bitstream 1118 comprising encoded group information and partial coefficients is transferred to system decoder 1150. Quantized image 1109 and transformed mask 1110 are subject to an inverse transform using inverse scale/quantize module 1112 and IDWT module 1114 in order to compute reference image 1116.

In the exemplary embodiment of FIG. 11, system decoder 1150 processes encoded image bitstream 1118 according to whether or not input image block 1100 has changed. In a scenario where input image block 1100 has not changed, previous display image 1172 and mask 1174 are fed back to DWT module 1158, processed by the pipeline and added to masked image bitstream 1118 to generate display image 1170. Masked image bitstream 1118 comprises encoded group information and partial coefficients for the next refinement level for the previous image. Specifically, mask 1174 is subject to mask transform processing in DWT module 1158 substantially similar to the mask transform processing of input mask 1102 when transformed by DWT module 1104. Previous image 1172 is transformed by DWT module 1158, scaled and quantized by scale/quantize module 1160 and processed using GrEWP encoder 1162 to generate previous group information 1180. GrEWP decoder 1152 uses previous group information 1180, previous mask information 1178 and previous coefficient information 1176 added to encoded bitstream 1118 to generate current coefficients 1153. These are then subjected to an inverse transform using inverse scale/quantize module 1154 and IDWT module 1156 to generate current display image 1170.

When input image 1100 changes, input mask 1102 is transmitted to system decoder 1150 as encoded mask 1124, the transmission supported by lossless mask encoder 1120 and corresponding mask decoder 1122. In an embodiment lossless mask encoding is implemented using binary encoding methods known to the art. Decoded mask 1126 is subject to a mask transform in DWT module 1158, fed through scale/quantize module 1160 and used by GrEWP decoder 1152 to support decoding of a first refinement level of encoded bitstream 1118. Previous image 1172 (which is obsolete due to the changed input image) is transformed by DWT module 1158 but quantized to zero in scale/quantize module 1160 so current coefficient information 1153 is derived strictly from mask 1178 and encoded block 1118. Current coefficient information 1153 is then subjected to an inverse transform using inverse scale/quantize module 1154 and IDWT module 1156 to generate a new display image 1170.

Figure 12:
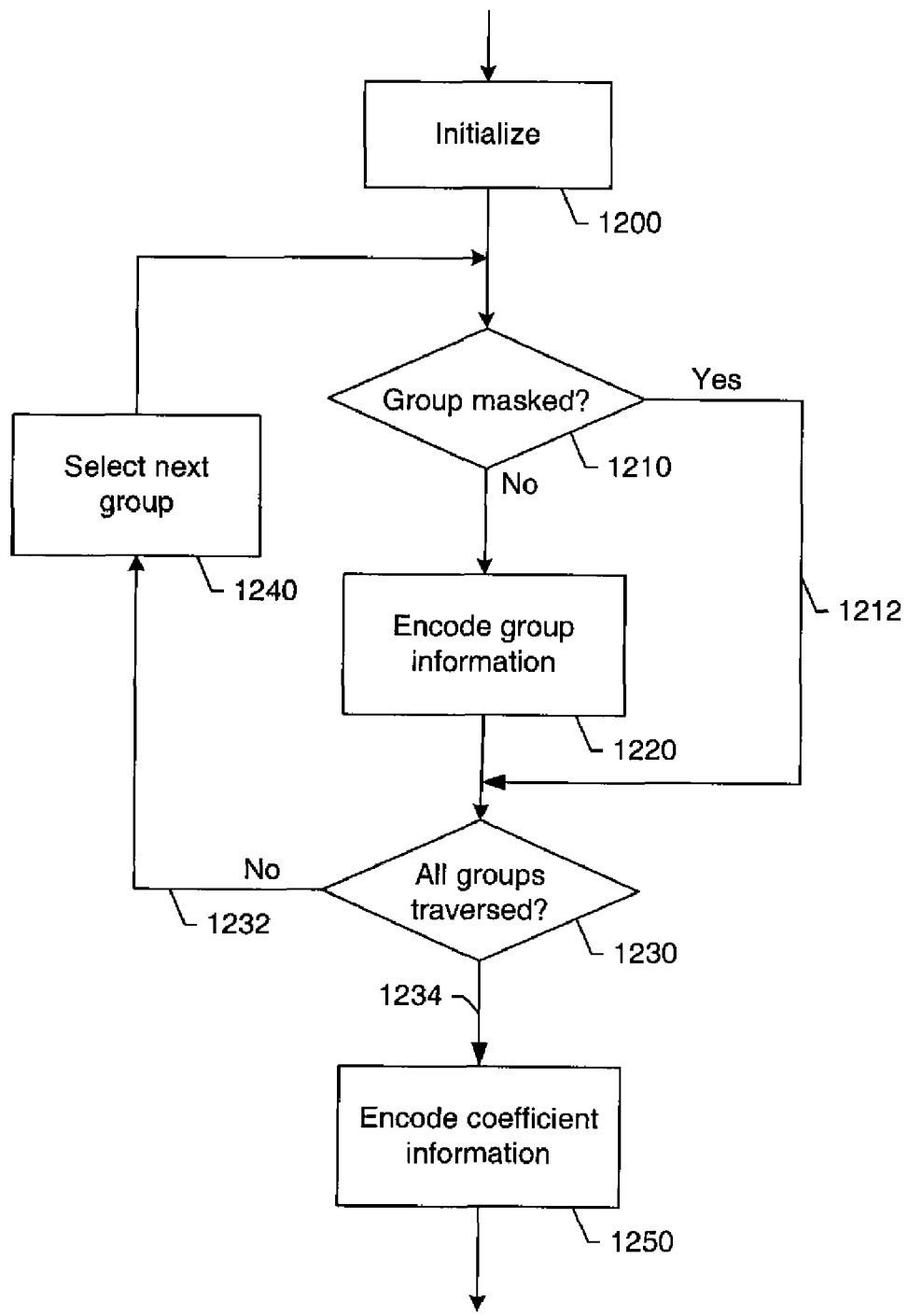
FIG. 12 illustrates a method for encoding a refinement range in a masked image embodiment.

FIG. 12 illustrates a method for encoding a refinement range in a masked image embodiment, for example as executed by GrEWP encoder 1108 in FIG. 11. In such a masked embodiment, a group is deemed as masked if all the coefficients in that group and its decedents are masked. In an embodiment, masked groups are identified during the calculation of group significance levels using an additional mask identifier.

The method shown in FIG. 12 is similar to the unmasked embodiment of encoding a refinement range described herein and illustrated in FIG. 7.

Encoding is initialized as a first step 1200. Progressive encoding starts at the top of the spatial orientation tree in which the root group has the highest group significance level. On each pass, the next refinement range is defined by setting a start value to the previously encoded significance level and an end value to a desired significance level. Group, cluster and mask information for the tree is also loaded. The root group is selected to initialize the encoding of group information.

As a next step 1210, a determination is made if a group is masked before group information is encoded as step 1220. If the group is masked, group information encoding is bypassed (reference 1212) as no coding of related coefficients is required.

As a next step 1220, group information is encoded. Group information for each group is determined according to the group's position relative to the refinement range. Group information is then encoded as common and individual parts using the cluster information. The common part is encoded ahead of the first individual part when the first group in a cluster is visited. If a group has only one unmasked child, only the common part is encoded as the individual part is known to be zero.

As a next step 1230 a determination is made whether all groups in the tree have been evaluated. In case 1232, not all groups have been tested so a next group is selected as a next step 1240 and the group information value for the newly selected group is checked for masking. Each time step 1240 is executed, a new group is selected such that the tree is traversed in any predetermined order in which parents are visited before children, for example a zigzag across each sub-band level and from root to leaves.

Once all groups have been evaluated 1234, the segments of all coefficients in the desired refinement range are determined, encoded and transmitted as next step 1250.

The several embodiments described herein are solely for the purpose of illustration. Persons skilled in the art will recognize from this description other embodiments may be practiced with modifications and alterations limited only by the claims.

What is claimed is:

1. A method of encoding data from a set of wavelet coefficients, the set of wavelet coefficients representing an image, the method comprising:
arranging the set of wavelet coefficients ("coefficients") into a spatial-orientation tree data structure comprising exclusive groups of the set of coefficients ("coefficient groups"), wherein:
each coefficient group having a parent coefficient, has a common coefficient parent;
each coefficient having a descendant coefficient, has a descendant coefficient group comprising the descendant coefficient; and
all of the coefficients of each coefficient group have a defined sub-band frequency association with other coefficients in that coefficient group;
determining, by a processor, a group significance level for a subject coefficient group of the coefficient groups, the group significance level for the subject coefficient group comprising an integer value from zero to greater than one, the group significance level for the subject coefficient group comprising the highest level of a set comprising: (i) a member significance level for each coefficient of the subject coefficient group; and (ii) the group significance level for the respective descendant coefficient group of each of the coefficients of the subject coefficient group, the member significance level comprising a bit position of the most significant bit of the absolute value of the associated coefficient, the bit position comprising a bit count from zero to greater than one;
determining, by the processor, the group significance level for a subject parent coefficient group comprising a parent coefficient of the subject group by repeating, for the subject parent coefficient group, the determining the group significance level for the subject parent coefficient group as the subject coefficient group;
calculating, by the processor, a delta between the group significance level of the subject parent coefficient group and the group significance level of the subject coefficient group;
encoding, by the processor, the delta as a bitstream;
encoding, by the processor, a range of a first coefficient magnitude of the subject coefficient group, the range comprising a plurality of bit planes; and
encoding, subsequent to encoding the range of the first coefficient magnitude, the range of a second coefficient magnitude of a second coefficient group of the coefficient groups.

2. The method of claim 1, wherein the range is a first refinement range and a first portion of the spatial orientation tree data structure having the first refinement range is encoded before a second portion of the tree data structure having a second refinement range is encoded, the first refinement range comprising a plurality of bitplanes, comprising significant bits, of the spatial orientation tree data structure, the second refinement range comprising at least one additional bitplane of the spatial orientation tree data structure.

3. The method of claim 1, wherein the delta comprises partial scalar components associated with differences between the group significance level of the subject parent coefficient group and group significance level of the subject coefficient group.

4. The method of claim 1, wherein the subject coefficient group is a member of a set of descendent coefficient groups sharing the subject parent coefficient group, wherein partial scalar components of significant level deltas between the subject parent coefficient group and the descendent coefficient groups are encoded as a common part and individual parts.

5. The method of claim 4, wherein the common part and each of the individual parts are (a) selected from the set of symbols and (b) transmitted as a continuous bitstream.

6. The method of claim 1, further comprising, repeating the transmitting a symbol representing a group significance delta, between a coefficient group and the coefficient's parent coefficient group, for each significant parent coefficient group of the set of wavelet coefficients.

7. The method of claim 6, wherein descendents of one coefficient of one coefficient group of the coefficient groups are masked and the set of wavelet coefficients are encoded as if the one coefficient has no descendants.

8. The method of claim 1, further comprising transmitting coefficient segments, of each coefficient of the subject coefficient group, below the group significance level of the subject coefficient group, wherein each of the coefficient segments comprises at least one bit and the at least one bit is transmitted as a stream of at least one bit.

9. The method of claim 8, wherein a plurality of bitplanes of the set of wavelet coefficients are within a refinement range to be encoded, and the coefficient segments comprise all the significant bits of the subject coefficient group within the refinement range.

10. The method of claim 9, wherein the refinement range is selected based on an available transmission bandwidth.

11. A non-transitory computer-readable medium containing instructions, which, when executed by a computer, causes encoding of data from a set of wavelet coefficients, the set of wavelet coefficients representing an image, by:
 arranging the set of wavelet coefficients ("coefficients") into a spatial-orientation tree data structure comprising exclusive groups of the set of coefficients ("coefficient groups"), wherein:
  each coefficient group having a parent coefficient, has a common coefficient parent;
  each coefficient having a descendant coefficient, has a descendant coefficient group comprising the descendant coefficient; and
  all of the coefficients of each coefficient group have a defined sub-band frequency association with other coefficients in that coefficient group;
 determining a group significance level for a subject coefficient group of the coefficient groups, the group significance level for the subject coefficient group comprising an integer value from zero to greater than one, the group significance level for the subject coefficient group comprising the highest level of a set comprising: (i) a member significance level for each coefficient of the subject coefficient group; and (ii) the group significance level for the respective descendant coefficient group of each of the coefficients of the subject coefficient group, the member significance level comprising a bit position of the most significant bit of the absolute value of the associated coefficient, the bit position comprising a bit count from zero to greater than one;
 determining the group significance level for a subject parent coefficient group comprising a parent coefficient of the subject group by repeating, for the subject parent coefficient group, the determining the group significance level for the subject parent coefficient group as the subject coefficient group;
 calculating a delta between the group significance level of the subject parent coefficient group and the group significance level of the subject coefficient group;
 encoding the delta as a bitstream;
 encoding a range of a first coefficient magnitude of the subject coefficient group, the range comprising a plurality of bit planes; and
 encoding, subsequent to encoding the range of the first coefficient magnitude, the range of a second magnitude of a second coefficient group of the coefficient groups.

12. The computer readable medium of claim 11, wherein the range is a first refinement range and a first portion of the spatial orientation tree data structure having the first refinement range is encoded before a second portion of the tree data structure having a second refinement range is encoded, the first refinement range comprising a plurality of bitplanes, comprising significant bits, of the spatial orientation tree data structure, the second refinement range comprising at least one additional bitplane of the spatial orientation tree data structure.

13. The computer readable medium of claim 11, wherein the delta comprises partial scalar components associated with differences between the group significance level of the subject parent coefficient group and group significance level of the subject coefficient group.

14. The computer readable medium of claim 11, wherein the subject coefficient group is a member of a set of descendent coefficient groups sharing the subject parent coefficient group, wherein partial scalar components of significant level deltas between the subject parent coefficient group and the descendent coefficient groups are encoded as a common part and individual parts.

15. The computer readable medium of claim 14, wherein the common part and each of the individual parts are (a) selected from the set of symbols and (b) transmitted as a continuous bitstream.

16. The computer readable medium of claim 11, further comprising, repeating the transmitting a symbol representing a group significance delta, between a coefficient group and the coefficient's parent coefficient group, for each significant parent coefficient group of the set of wavelet coefficients.

17. The computer readable medium of claim 16, wherein descendents of one coefficient of one coefficient group of the coefficient groups are masked and the set of wavelet coefficients are encoded as if the one coefficient has no descendants.

18. The computer readable medium of claim 11, further comprising transmitting coefficient segments, of each coefficient of the subject coefficient group, below the group significance level of the subject coefficient group, wherein each of the coefficient segments comprises at least one bit and the at least one bit is transmitted as a stream of at least one bit.

19. The computer readable medium of claim 18, wherein a plurality of bitplanes of the set of wavelet coefficients are within a refinement range to be encoded, and the coefficient segments comprise all the significant bits of the subject coefficient group within the refinement range.

20. The computer readable medium of claim 19, wherein the refinement range is selected based on an available transmission bandwidth.

21. A system for encoding data from a set of wavelet coefficients, the set of wavelet coefficients representing an image, the system comprising:
 a physical memory containing the set of wavelet coefficients to be transmitted;
 means for arranging the set of wavelet coefficients ("coefficients") into a spatial-orientation tree data structure comprising exclusive groups of the set of coefficients ("coefficient groups"), wherein:
  each coefficient group having a parent coefficient, has a common coefficient parent;
  each coefficient having a descendant coefficient, has a descendant coefficient group comprising the descendant coefficient; and
  all of the coefficients of each coefficient group have a defined sub-band frequency association with other coefficients in that coefficient group;
 means for determining a group significance level for a subject coefficient group of the coefficient groups, the group significance level for the subject coefficient group comprising an integer value from zero to greater than one, the group significance level for the subject coefficient group comprising the highest level of a set comprising: (i) a member significance level for each coefficient of the subject coefficient group; and (ii) the group significance level for the respective descendant coefficient group of each of the coefficients of the subject coefficient group, the member significance level comprising a bit position of the most significant bit of the absolute value of the associated coefficient, the bit position comprising a bit count from zero to greater than one;
 means for determining the group significance level for a subject parent coefficient group comprising a parent coefficient of the subject group by repeating, for the subject parent coefficient group, the determining the group significance level for the subject parent coefficient group as the subject coefficient group;

means for calculating a delta between the group significance level of the subject parent coefficient group and the group significance level of the subject coefficient group means for encoding the delta as a bitstream;

means for encoding a range of a first coefficient magnitude of the subject coefficient group, the range comprising a plurality of bit planes; and means for encoding, subsequent to encoding the range of the first of the first coefficient magnitude, the range of a second magnitude of a second coefficient group of the coefficient groups.

22. The system of claim 21, wherein the range is a first refinement range and a first portion of the spatial orientation tree data structure having the first refinement range is encoded before a second portion of the tree data structure having a second refinement range is encoded, the first refinement range comprising a plurality of bitplanes, comprising significant bits, of the spatial orientation tree data structure, the second refinement range comprising at least one additional bitplane of the spatial orientation tree data structure.

23. The system of claim 21, wherein the delta comprises partial scalar components associated with differences between the group significance level of the subject parent coefficient group and group significance levels of the subject coefficient group.

24. The system of claim 21, wherein the subject coefficient group is a member of a set of descendent coefficient groups sharing the subject parent coefficient group, wherein partial scalar components of significant level deltas between the subject parent coefficient group and the descendent coefficient groups are encoded as a common part and individual parts.

25. The system of claim 24, wherein the common part and each of the individual parts are (a) selected from the set of symbols and (b) transmitted as a continuous bitstream.

26. The system of claim 21, further comprising, repeating the transmitting a symbol representing a group significance delta, between a coefficient group and the coefficient's parent coefficient group, for each significant parent coefficient group of the set of wavelet coefficients.

27. The system of claim 26, wherein descendents of one coefficient of one coefficient group of the coefficient groups are masked and the set of wavelet coefficients are encoded as if the one coefficient has no descendants.

28. The system of claim 21, further comprising transmitting coefficient segments, of each coefficient of the subject coefficient group, below the group significance level of the subject coefficient group, wherein each of the coefficient segments comprises at least one bit and the at least one bit is transmitted as a stream of at least one bit.

29. The system of claim 28, wherein a plurality of bitplanes of the set of wavelet coefficients are within a refinement range to be encoded, and the coefficient segments comprise all the significant bits of the subject coefficient group within the refinement range.

30. The system of claim 29, wherein the refinement range is selected based on an available transmission bandwidth.

31. The method of claim 1, wherein a single instance of (1) the determining the group significance level for each of the coefficient groups, (2) the calculating, for each of the coefficient groups, respective deltas between each of the group significance levels and the associated parent group significance level and (3) determining respective encoded symbols for the respective deltas, is performed in the encoding of a plurality of significant bit-planes.

\* \* \* \* \*